(12) United States Patent
Tang

(10) Patent No.: US 8,757,529 B2
(45) Date of Patent: Jun. 24, 2014

(54) CONDIMENT GRINDER

(75) Inventor: Yu Wing Tang, Hong Kong (HK)

(73) Assignee: Samson Bright Industrial Company Limited, Hunghom, Kowloon (HK)

( * ) Notice: Subject to any disclaimer, the term of this patent is extended or adjusted under 35 U.S.C. 154(b) by 513 days.

(21) Appl. No.: 13/070,419

(22) Filed: Mar. 23, 2011

(65) Prior Publication Data

US 2012/0241543 A1 Sep. 27, 2012

(51) Int. Cl.
*A47J 42/04* (2006.01)

(52) U.S. Cl.
USPC .......................... 241/169.1; 241/168; 241/169

(58) Field of Classification Search
USPC ........... 241/168, 169, 169.1, 258, 259, 273.2, 241/101.2, 101.3; 222/142.1, 142.2, 142.4; 72/452.1, 452.2, 452.3
See application file for complete search history.

(56) References Cited

U.S. PATENT DOCUMENTS

| | | | | |
|---|---|---|---|---|
| 4,844,352 A | * | 7/1989 | Griffin | 241/101.2 |
| 5,531,389 A | * | 7/1996 | Husted | 241/169.1 |
| 5,651,506 A | * | 7/1997 | Hockey | 241/169.1 |
| 7,637,447 B2 | * | 12/2009 | Tang | 241/169.1 |
| 7,988,081 B2 | * | 8/2011 | Robbins | 241/169 |

* cited by examiner

*Primary Examiner* — Shelley Self
*Assistant Examiner* — Homer Boyer
(74) *Attorney, Agent, or Firm* — Ella Cheong Hong Kong; Sam T. Yip

(57) ABSTRACT

A condiment grinder which has a body for containing different types of condiment seeds and at least three grinding mechanisms provided at an open end of the body through which condiments ground by the respective grinding mechanisms are to be dispensed. An actuator is provided with the grinder for upon actuation generating a drive that drives the grinding mechanisms via respective transmission paths. A clutch in each of the transmission paths is used to establish and disestablish transmission of the drive via that transmission path, and there is a manually operable selecting mechanism for selecting and operating one of the clutches in order to establish transmission of the drive via the relevant transmission path.

21 Claims, 12 Drawing Sheets

CONDIMENT GRINDER

The present invention relates to a condiment grinder and particularly, but not exclusively, with more than one grinding mechanisms.

BACKGROUND OF THE INVENTION

Most of the condiment grinders are designed to contain and grind one type of condiment. To grind two or more condiments, the condiments have to be mixed and grind together. In most cases, user does not desire a mixture of condiments ground. To solve this problem, condiment grinders with two containers and respective grinding mechanisms are available. The knob of the condiment grinder is rotated clockwise or anticlockwise to activate one of the two grinding mechanisms. In that way, only one type of condiment is ground. However, the number of selection is limited, technically only two. This is clearly insufficient in view of the number of condiments available.

The subject invention seeks provide an improved condiment grinder incorporating with at least three grinding mechanisms and permit selective grinding of at least three condiments.

SUMMARY OF THE INVENTION

According to the invention, there is provided a condiment grinder comprising:
- a body for containing different types of condiment seeds;
- at least three grinding mechanisms provided at an open end of the body through which condiments ground by the respective grinding mechanisms are to be dispensed,
- an actuator for upon actuation generating a drive that drives the grinding mechanisms via respective transmission paths,
- a clutch in each of the transmission paths for establishing and disestablishing transmission of the drive via that transmission path, and
- a manually operable selecting mechanism for selecting and operating one of the clutches in order to establish transmission of the drive via the relevant transmission path.

Preferably, each of the clutches comprises a driving part and a driven part which upon engagement transmits drive and upon disengagement does not transmit drive.

More preferably, the driving part is resiliently biased against the driven part such that the clutch is normally at an operating position for establishing the transmission.

In a preferred arrangement, each clutch includes a spring that resiliently biases the driving part against the respective driven part.

It is preferred that the selecting mechanism comprises a selector and at least three operators each for operating a respective clutch.

In a preferred embodiment, each of the operators is engageable with a respective clutch against a resilient bias to disestablish transmission of the drive via the respective transmission path.

More preferably, each of the operators comprises a first part and a second part together for providing a cam action to translate a motion in a first direction applied by the selector into a motion in a second direction applied to the respective clutch, whereby the clutch is operated.

Further more preferably, the body has a main axis, and the first part is movable by the selector transversely to the main axis and the second part is movable by the first part parallel to the main axis.

Yet further more preferably, the first parts are resiliently biased away from the main axis of the body.

Conveniently, the first parts are resiliently biased away from the main axis by respective coil springs.

It is preferred that the selector is arranged to permit movement of a selected one of the operators, thereby allowing the clutch to reach the operating position against a resilient bias.

It is preferred that the selector comprises a ring with a recess on its inner periphery for receiving one of the operators aligned therewith, with the first part of the aligned operator then moving into the recess under the action of a resilient bias thereby causing movement of the second part to in turn operate the respective clutch for, in the operating position, establishing the transmission in the respective one path.

In a preferred embodiment, the selector is arranged to be turned relative to the body for moving the recess to align with one of the operators.

Preferably, the selector and the body are in inter-engagement by inter-engageable parts to define a plurality of predetermined angular positions for the selecting mechanism relative to the body.

In a preferred construction, the inter-engageable parts comprise a protrusion and a series of recesses corresponding to the predetermined positions.

Preferably, the body is divided into three or more compartments for containing different types of condiment seeds.

More preferably, the grinding mechanism comprising a female grinder and a male grinder supported co-axially in the female grinder for rotation relative thereto for grinding condiment, the two grinders being spaced apart by an annular gap in which condiment is to be ground.

It is preferred that the female grinder is separated from the male grinder by a gap, the grinders are movable relative to one another to adjust width of the gap between the grinders and in turn the condiment grinding size.

Conveniently, the actuator is arranged to be turned relative to the body to generate the drive.

It is preferred that the actuator includes a shaft connected to a drive output gear that is meshed with a driving part of each of the clutches such that turning of the actuator will bring about rotation of the driving parts of all the clutches.

Preferably, the open end of the body is attached to a base for standing the body on a surface.

BRIEF DESCRIPTION OF DRAWINGS

The invention will now be more particularly described, by way of example only, with reference to the accompanying drawings, in which.

DETAILED DESCRIPTION OF PREFERRED EMBODIMENT

Figure 1:
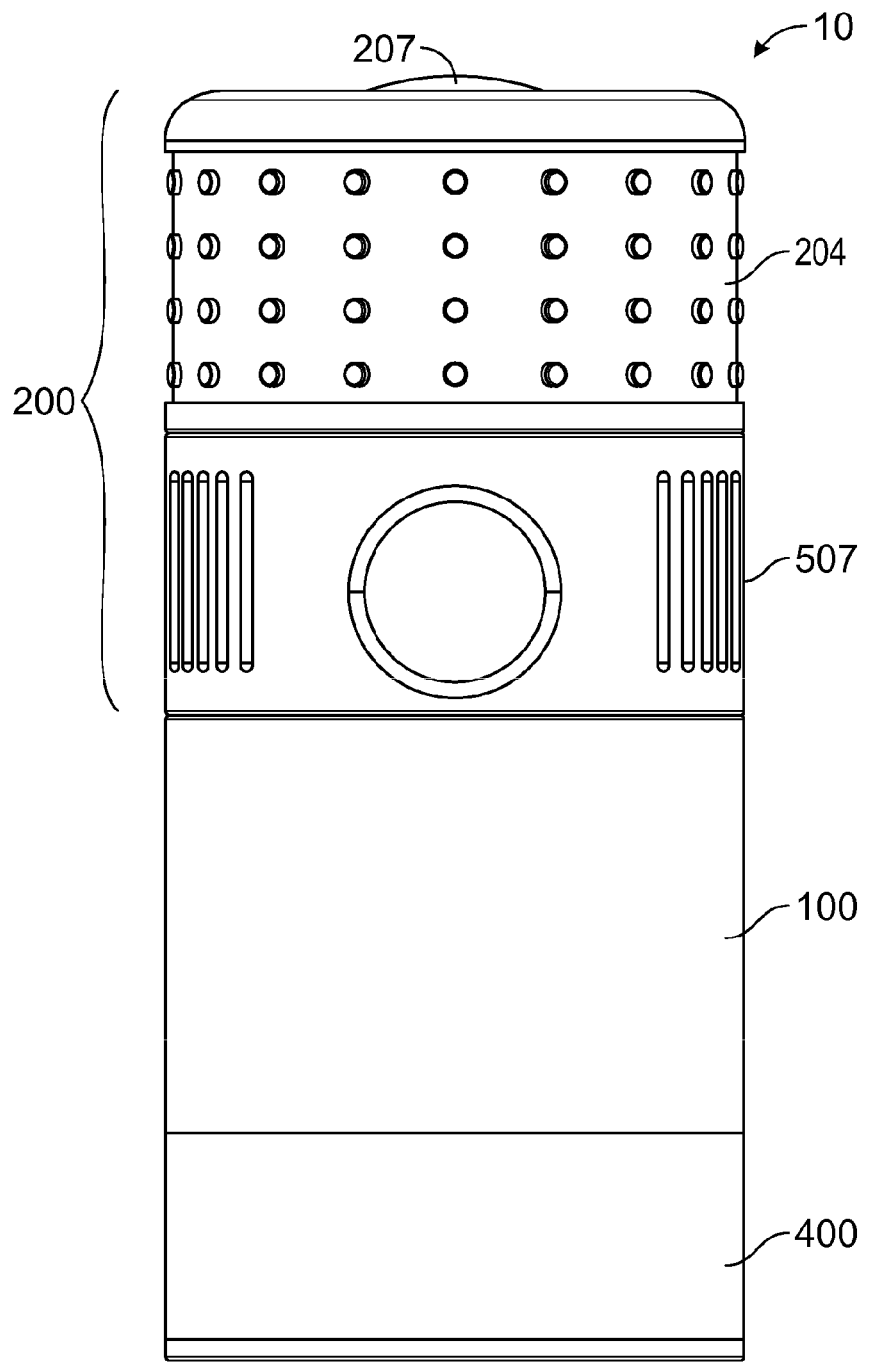
FIG. 1 is a front view of an embodiment of a condiment grinder in accordance with the invention.

Referring to the drawings, there is shown a condiment grinder 10 embodying the invention, which has an upright substantially cylindrical plastic body 100 divided into three compartments for containing three different types of condiment seeds, compartment walls at an angle of 120 degree with respect to one another, a lid 200 closing an open top end portion 110 of the body 100 through which the body 100 may be refilled with the condiment seeds, and a base 400 attached to the body 100 for standing the body 100 on a surface. Three grinding mechanisms 300, 301 and 302 are installed in the body 100 and base 400. The lid 200 and the base 400 are arranged co-axially about a vertical central axis 208 of the body 100. The lid 200 includes an actuator in the form of a turning knob 204 for generating a drive to drive the three grinding mechanisms 300, 301 and 302 via separate transmission paths 201, 202 and 203, whilst the base 400 is hollow to accommodate three knobs 401, 402 and 403 of the grinding mechanisms 300, 301 and 302. These knobs 401, 402 and 403 may be turned to adjust the fineness/coarseness of condiment seeds ground by and dispensed through the respective grinding mechanisms 300, 301 and 302.

Each transmission path 201, 202, or 203 is connected and aligned axially 304, 305, or 306 with the respective grinding mechanism 300, 301, or 302.

The grinding mechanisms 300, 301 and 302 each has a square-sectioned metal central operating shaft 310, 311 and 312 which extends upwardly from within the base 400 through the body 100 and is connected to the lid 200 by the respective transmission path 201, 202 and 203, a central drive output gear 205 and a central shaft 206. The central shaft 206 is fitted at its top end 311 with a round nut 207 that holds the lid 200 closed. Each of the grinding mechanisms 300, 301 and 302 includes a pair of porcelain female and male grinders 370 and 380, through the two of which the respective shaft 310, 311 or 312 passes.

Figure 7A:
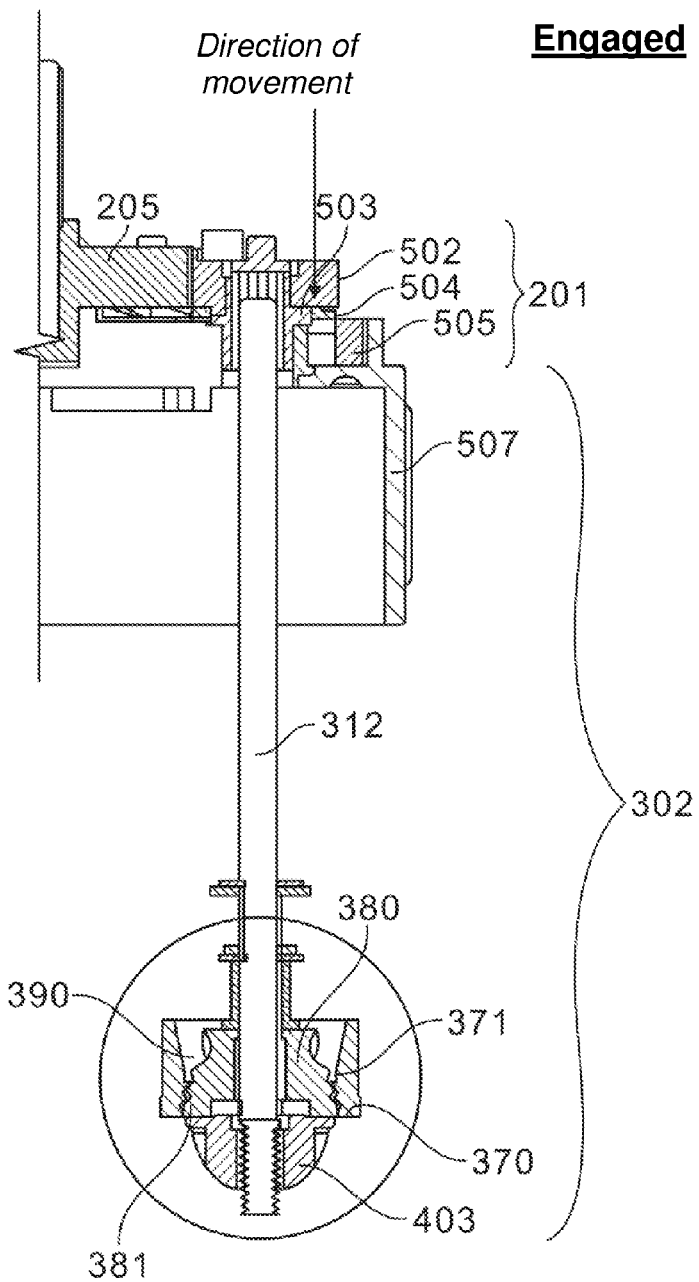
FIGS. 7A and 7B are a cross-sectional view of part of the condiment grinder of FIG. 1 taken along its length, where in FIG. 7A, a first gear is movable downward into engagement with a second gear so as to transmit a drive to a grinding mechanism, and in FIG. 7B, the first gear is movable upward to disengage from the second gear so that the drive is not transmitted to the grinding mechanism.
Figure 7B:
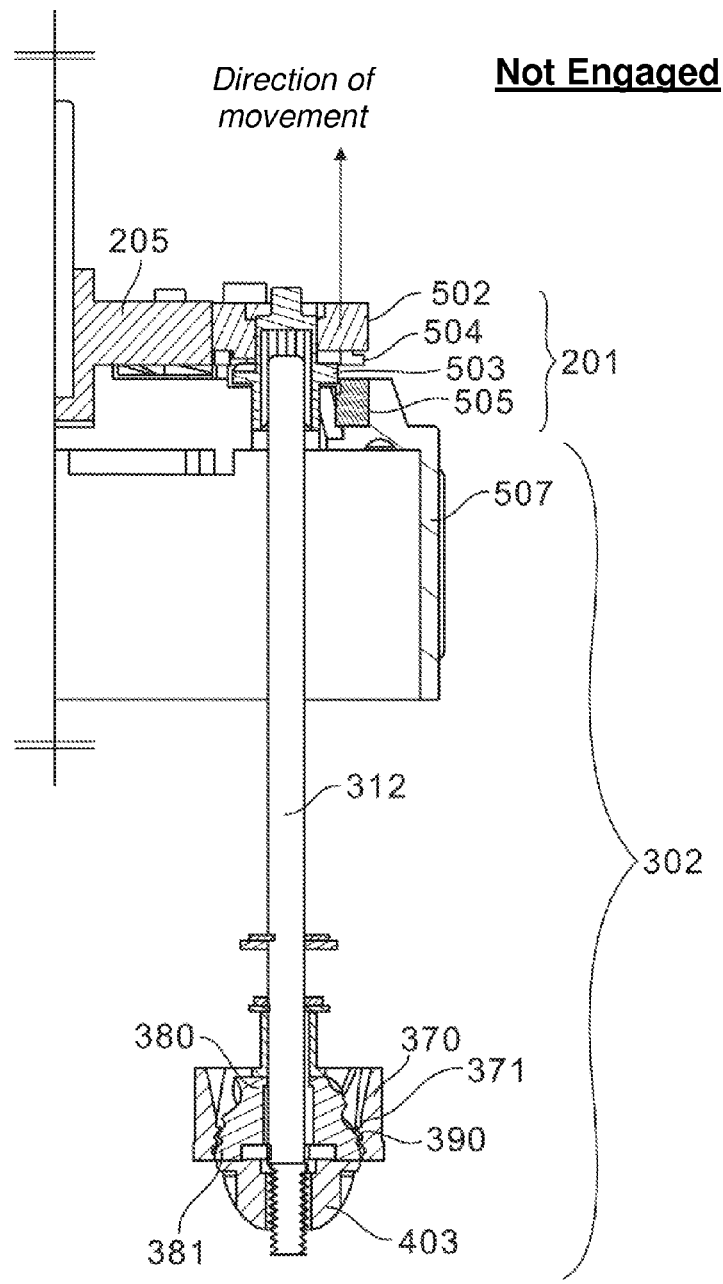
Figure 8:
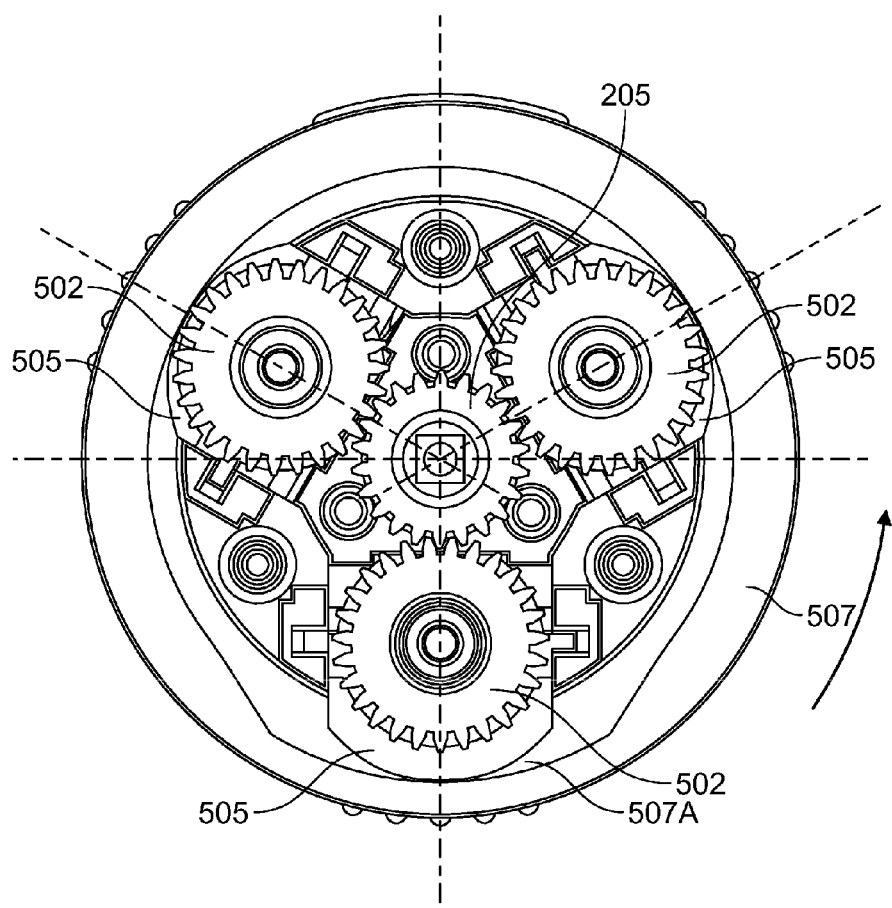
FIG. 8 is a top plan view of transmission path in the condiment grinder of FIG. 1.

The female grinder 370 has a cylindrical body whose inner surface has frusto-conically shaped upper part and inverted frusto-conically shaped lower parts as shown in FIG. 7A or FIG. 7B, on which respective slightly skewed teeth 371 are formed. The male grinder 380 has a generally inverted frusto-conical body which includes a square central through hole engaging the respective shaft 310, 311 or 312 for rotation thereby and whose outer surface has skewed teeth 381. The male grinder 380 remains generally within the female grinder 370, being spaced apart by an annular gap and in particular a frusto-conical gap 390 between their teeth 381 and 371 in which condiment seeds are to be ground.

The transmission paths 201, 202 and 203 are accommodated in the lid 200 immediately above the body 100. Each transmission path 201, 202 or 203 includes a clutch with separable gears 502 and 503, one being a driving part and the other a driven part. The clutch is at its operating position when the gear 502 meshes and aligned with the gear 503 axially. The gear 502 is movable downward into engagement with the gear 503 to establish transmission of the drive, as shown in FIG. 7A. In addition, the gear 502 is movable upward to disengage from gear 503 to disestablish transmission of the drive, as illustrated in FIG. 7B. The gear 502 is resiliently biased downward towards the gear 503 at all times. The gear 502 is biased by a coil spring 501. All the gears 502 and 503 are controlled by a manually operable selecting mechanism.

In a different embodiment, a multiple clutch may be employed for all the three transmission paths 201, 202 and 203. The multiple clutch incorporates three driven parts and only one common driving part for movement to and engagement with any one of the three driven parts. The common driving part is movable by a selector to engage with one of the driven parts so as to establish transmission of the drive to the respective grinding mechanism. By changing the position of the selector, the driving part can be disengaged from that driven part to engage with one of the other driven parts so as to establish transmission of the drive to a different grinding mechanism.

The selecting mechanism includes three operators, each of which has a two-part configuration, i.e., a slider 505 as the first part and a seat 504 as the second part. Each of the sliders 505 is engageable from below with a respective seat 504 and is resiliently biased by a respective pair of spring coils 506 in a direction radially away from the central axis 208 of the body 100. Also included is a selector 507 which is engageable with all the sliders 505 in the transmission paths 201, 202 and 203. The direction in which the sliders 505 are resiliently biased is substantially perpendicular to that in which the gears 502 are resiliently biased.

Each of the sliders 505 and its associated seat 504 together form a cam for translating a horizontal motion of the selector 507 into a vertical motion of the gear 502 of the clutch to thereby establish and disestablish the transmission in the respective path 201, 202 or 203. The slider 505 is U-shaped with a top surface having a substantially flat horizontal section 505A, a downwardly slanted section 505B leading to a groove 505C. The seat 504 has a projection 504A that abuts the top surface of the slider 505 when the slider 505 aligns with the seat 504.

The selector 507 is in the form of a cylindrical ring having a recess 507A at its inner periphery. The recess 507A is shaped to receive at least part of one slider 505. The selector 507 is turnable about the top end portion 110 of the body 100 to selectively align the recess 507A with one of the sliders 505. Under the action of the spring coils 506, the slider 505 slides sideway into the recess 507A to come out of alignment with the seat 504.

The projection 504A of the seat 504 slides a long the sections 505A and 505B and then falls into the groove 505C, thereby allowing the seat 504 to move vertically downwards, parallel to the central axis 208 and away from gear 502. As the seat 504 no longer abuts the gear 502, the action against resilient bias of the coil spring 501 is removed thereby permitting the gear 502 to mesh with gear 503. This establishes transmission in the relevant one of the transmission paths, such as the transmission path 201 as shown.

Transmission of the drive is detailed as follow. Turning of the knob 204 causes the shaft 206 to rotate and create a rotational drive. Rotation of the shaft 206 brings about rotation of the gear 205. The gear 205 meshes with gears 502 of each transmission path 201, 202 or 203 to bring about rotation of all of the gears 502. By rotating the selector 507, the recess 507A is aligned with the slider 505 in the path 201 (for example). The respective seat 504 moves away from the gear 502 in the path 201, see FIG. 7A. The gear 502 is then meshed with the gear 503 in the path 201. The rotational drive is thereby transmitted to the shaft 312 of the grinding mechanism 302 such that condiment seeds in the relevant compartment, say the compartment 102 in which the grinding mechanism 302 is stalled, is ground.

The selector 507 is inter-engageable with the body 100 by a plurality of inter-engageable parts 700 to define a plurality of predetermined angular positions for the selector 507 relative to the body 100.

Figure 2:
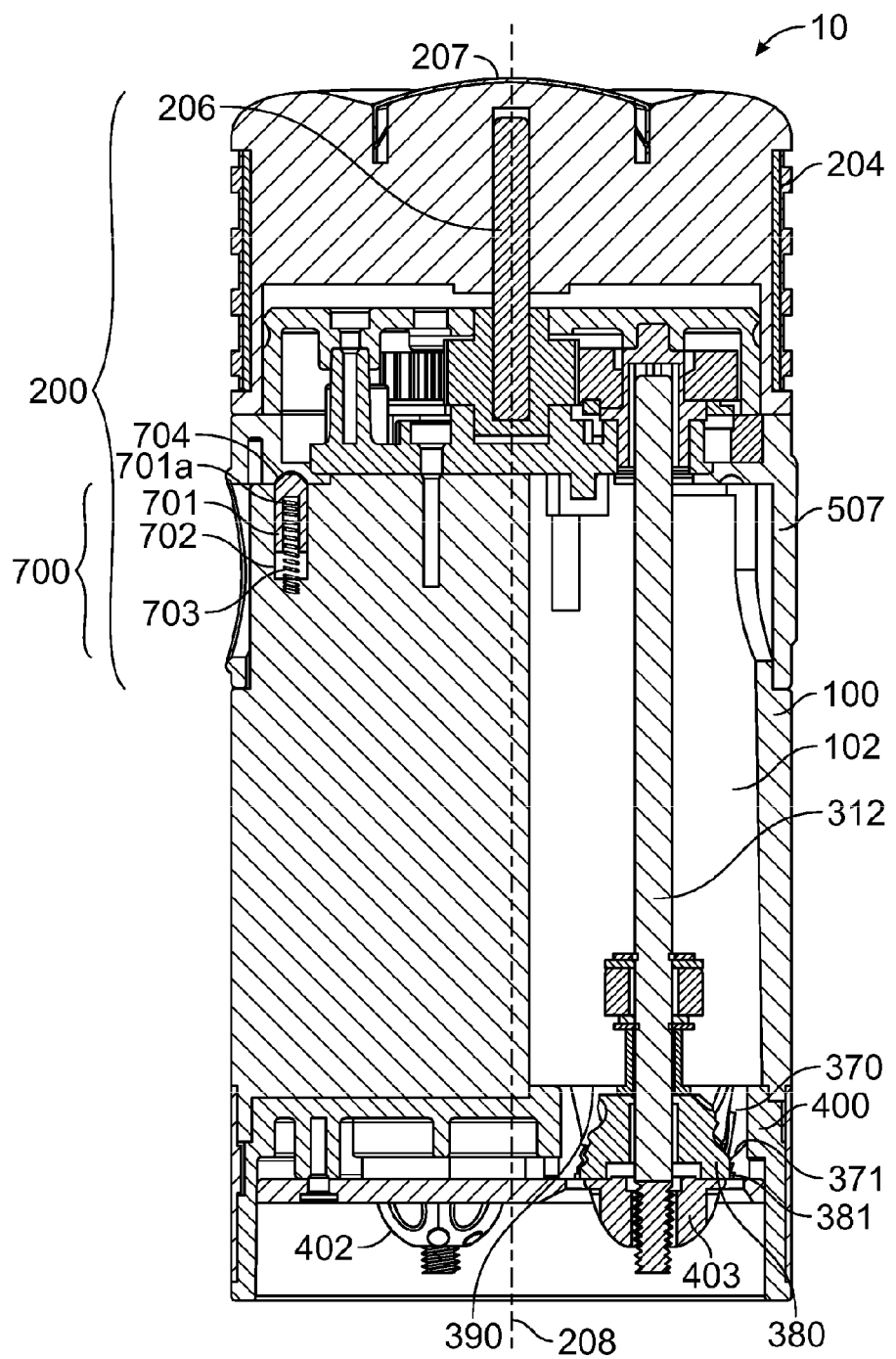
FIG. 2 is a cross-sectional view of the condiment grinder of FIG. 1 taken along its length.
Figure 3:
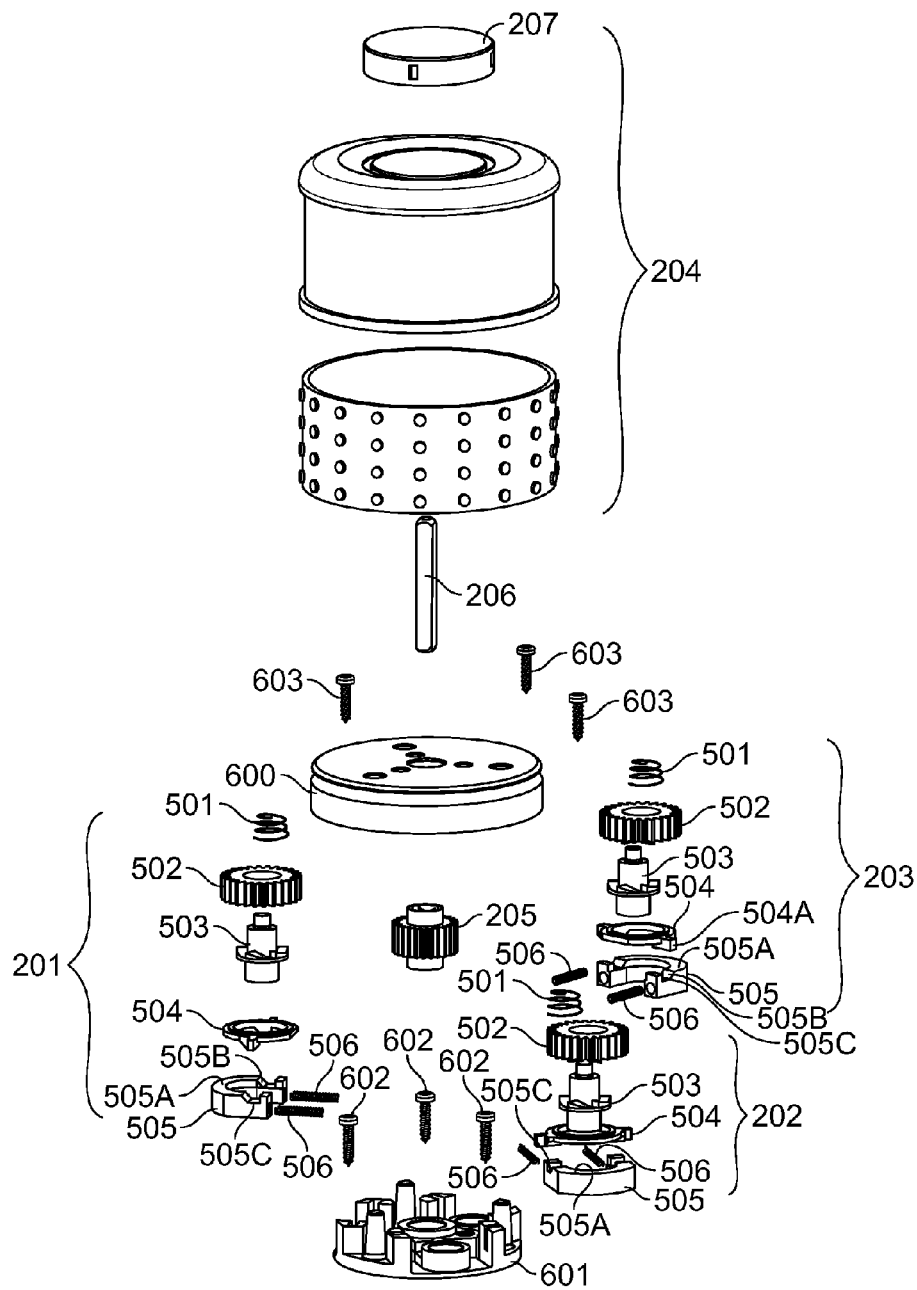
FIG. 3 is an exploded view of a lid of the condiment grinder of FIG. 1.
Figure 4:
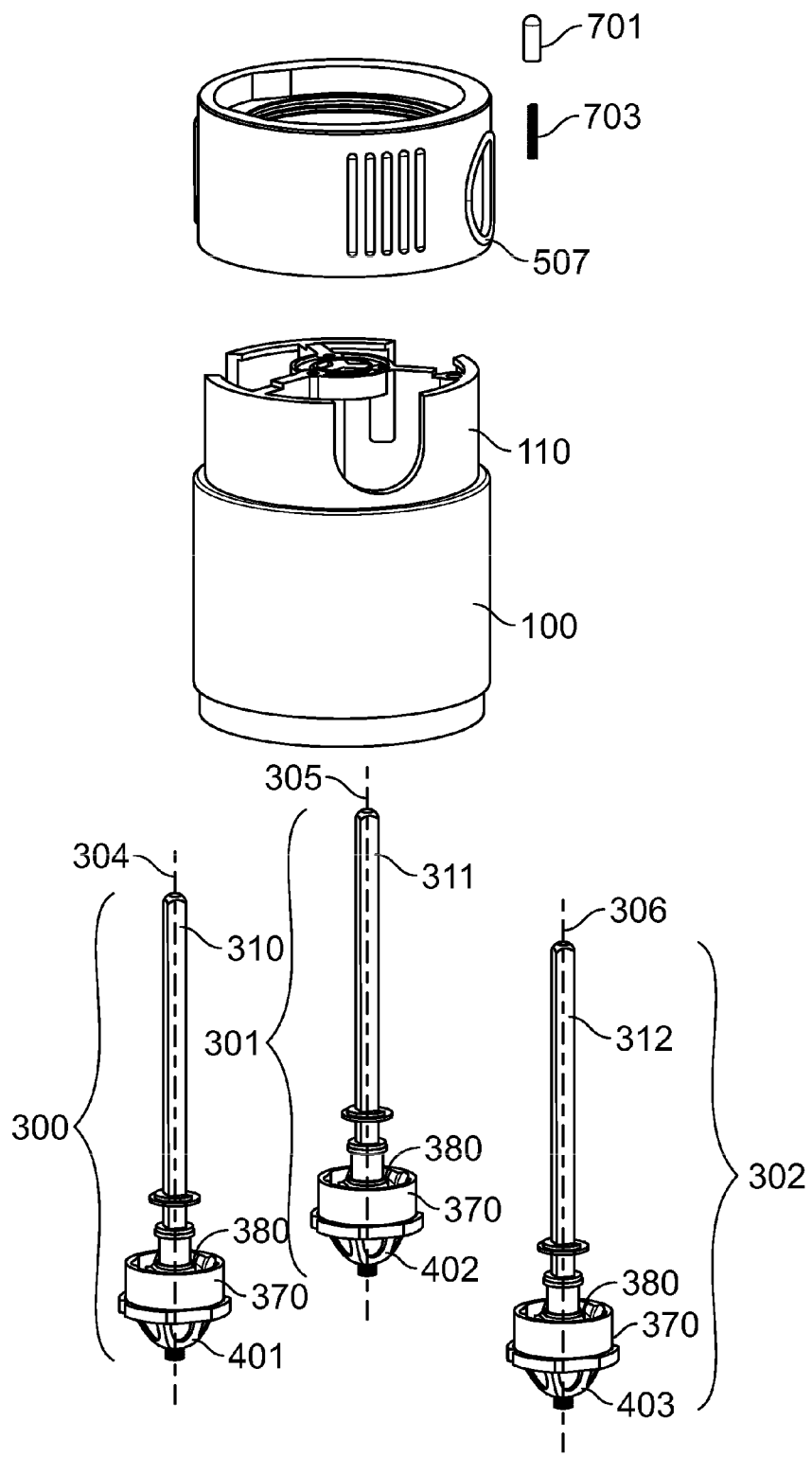
FIG. 4 is an exploded view of a body of the condiment grinder of FIG. 1.
Figure 5:
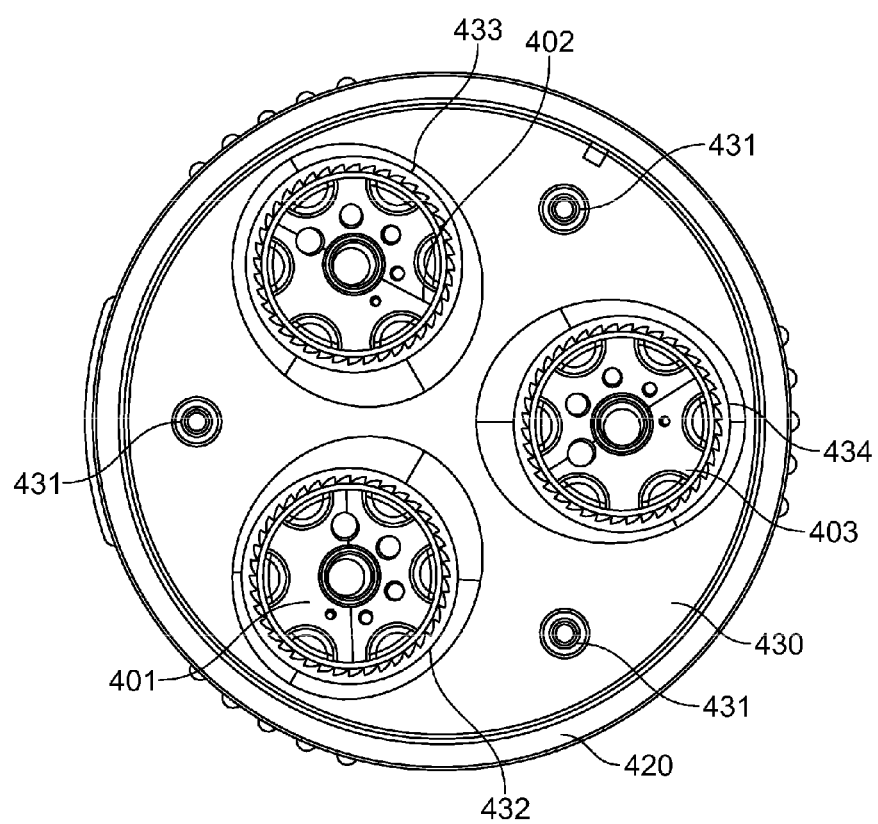
FIG. 5 is an exploded view of a base of the condiment grinder of FIG. 1.

Referring to FIGS. 2 and 4, the inter-engageable parts include a plunger 701, a groove 702 extending partly along length of the top end portion 110 of the body 100 and a resilient biasing means in the form of a coil spring 703. The selector 507 has a series of recesses 704 at intervals on underside of its top surface for accommodating upper tip of the plunger 701. The plunger 701 has an aperture 701A for accommodating part of the coil spring 703. A substantial part of the plunger 701 and whole coil spring 703 are inserted into the groove 702. The plunger 701 is resiliently biased to abut the recess 704 of the selector 507. The recess 704 is concave and the plunger tip is convex. Assuming that the plunger 701 is aligned with one of the recesses 704, upon turning of the selector 507, the wall of the recess pushes the tip of the plunger 701 into the groove 702 against the resilient bias of the coil spring 703. Continues turning of the selector 507 causes the tip of the plunger 701 to slide across the underside of the selector 507. When the plunger 701 reaches another recess 704 at a different position and turning force is removed, the plunger 701 resiliently biased to slide upward into this another recess 704 to retain the selector 507 until the turning force is re-applied.

The transmission paths 201, 202 and 203 are sandwiched between a cover 600 and a holder base 601. The holder base 601 fixedly placed in the selector 507 by three threaded screws 602. The cover 600 is fixedly connected to the holder base 601 by another three threaded screws 603. The cover 600 has a central aperture through which the shaft 206 passes. The shaft 206 is fixedly inserted through the gear 205 at one end and fixedly connected to the round nut 207 of the knob 204 at the other end such that turning of the knob 204 causes the gear 205 to rotate.

Referring to the three grinding mechanisms 300, 301 and 302, in each of them, the male grinder 380, the female grinder 370 and the respective knob 401, 402 or 403 are aligned co-axially. The knobs 401, 402 and 403 are screwedly engaged with the respective shafts 310, 311 and 312 and abut the respective male grinder 380. Turning of the knob 401, 402 or 403 clockwise permits sliding of the respective male grinder 380 relatively away from the respective female grinder 370, this increases size of the gap 390 between the female and male grinders 370 and 380 to reduce fineness/increases coarseness of condiment seeds ground by and dispensed through the respective grinding mechanism 300, 301 and 302. Likewise, by turning the knob 401, 402 or 403 anti-clockwise pushes the respective male grinder 380 towards the respective female grinder 370 to reduce the size of the respective gap 390 thereby increases fineness/reduces coarseness of condiment seeds ground by and dispensed through the respective grinding mechanism 300, 301 and 302.

Figure 6:
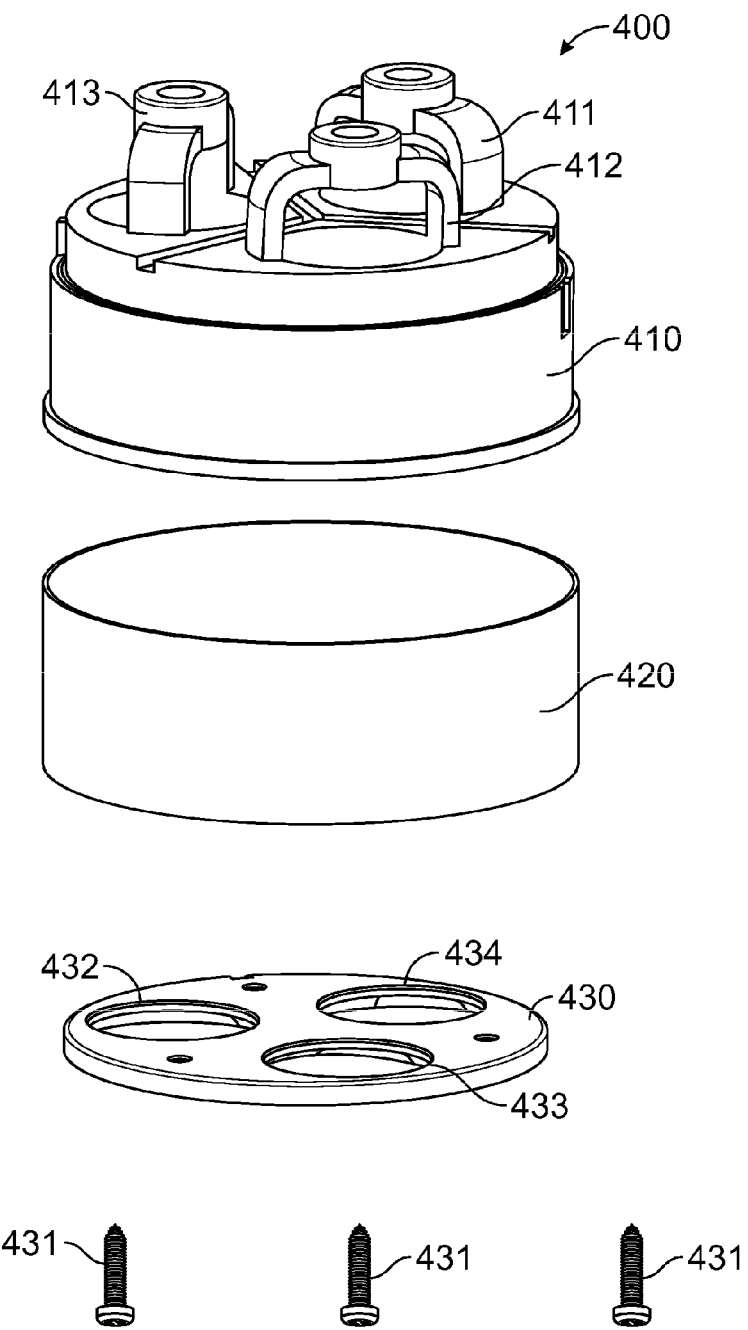
FIG. 6 is a bottom view of the condiment grinder of FIG. 1.

Referring to FIG. 6, the base 400 has three parts 410, 420 and 430. The parts are inter-connected by three threaded screws 431. Middle part 410 has three seats 411, 412 and 413. These three seats projects from top surface of the middle part 410 and each has a through hole for accommodating the shafts 310, 311 and 312 respectively. Inner part is a plate 430 which has three through holes 432, 433 and 434. Outermost part is a collar 420 that snaps fit onto periphery of the middle part 410. The grinding mechanisms 300, 301 and 302 are held in position by the seats 411, 412 and 413 respectively. The shaft 310, 311 and 312 pass the respective through holes in the seats 411, 412 and 413. The respective male and female grinders 370 and 380 are placed underneath the seats 411, 412 and 413. The knobs 401, 402 and 403 are connected to the shaft 310, 311 and 312 from below the respective male and female grinders 370 and 380 through the holes 432, 433 and 434.

Figure 9:
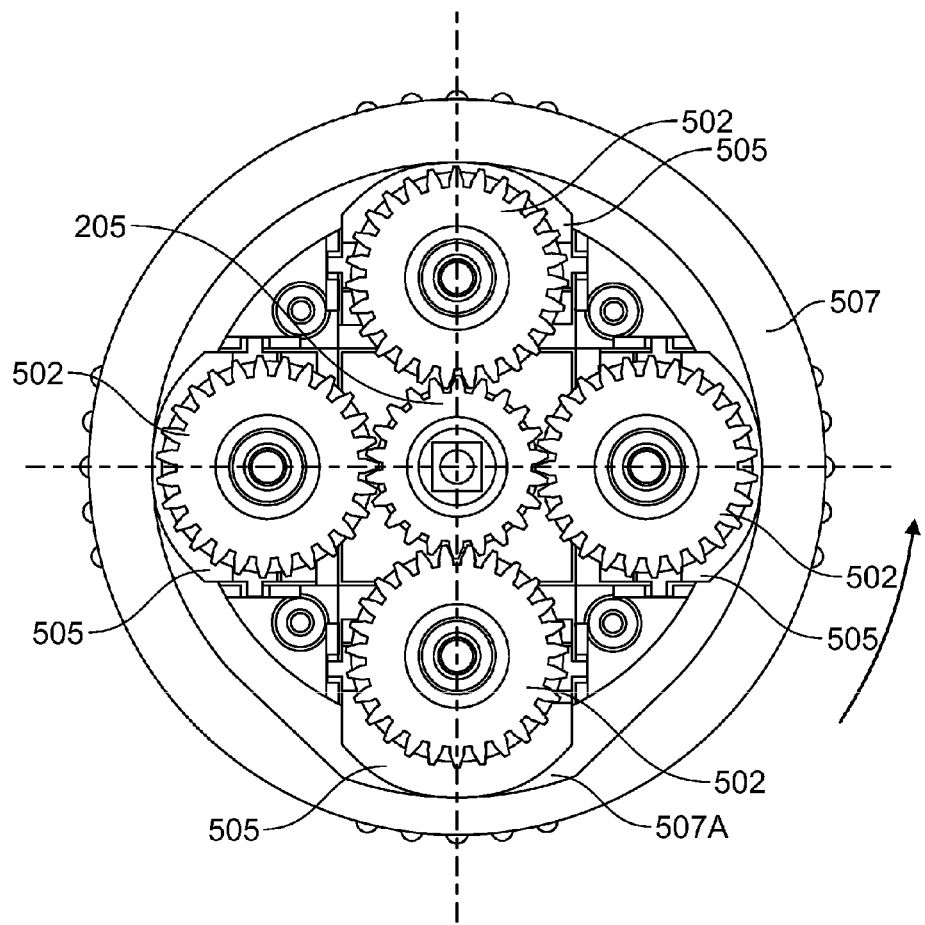
FIG. 9 is a top plan view of transmission path in a different embodiment of a condiment grinder in accordance with the invention.

In another embodiment of the invention as shown in FIG. 9, the body 100 is divided into four compartments. The compartment walls are at an angle of 90 degrees with respect to one another. There are four transmission paths.

Figure 10:
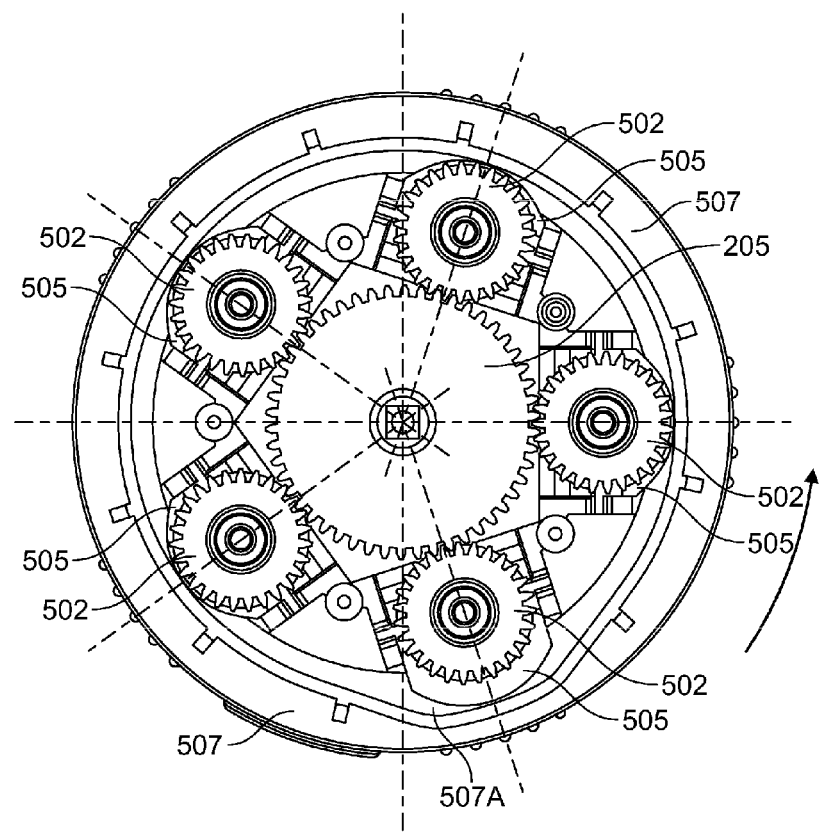
FIG. 10 is a top plan view of transmission path in a further embodiment of a condiment grinder in accordance with the invention.

In a further embodiment of the invention as shown in FIG. 10, the body 100 is divided into five compartments. The compartment walls are at an angle of 72 degrees with respect to one another. There are five transmission paths.

Figure 11:
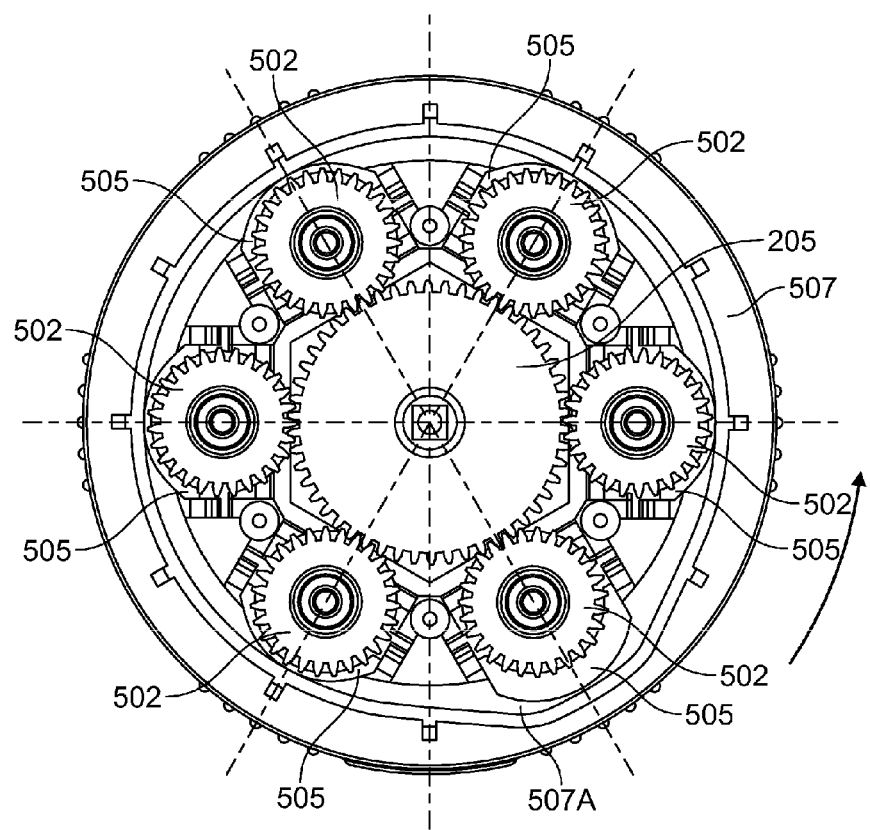
FIG. 11 is a top plan view of transmission path in an even further embodiment of a condiment grinder in accordance with the invention.

In an even further embodiment of the invention as shown in FIG. 11, the body 100 is divided into six compartments. The compartment walls are at an angle of 60 degrees with respect to one another. There are six transmission paths.

It is envisaged that, in an alternative embodiment, there may be three or more selectors 507 each acting upon respective sliders 505 in the corresponding transmission paths 300, 301 and 302.

The invention has been given by way of example only, and various other modifications and/or variations to the described embodiments may be made by persons skilled in the art without departing from the scope of the invention as specified in the accompanying claims.

The invention claimed is:

1. A condiment grinder comprising:
   a body for containing different types of condiment seeds;
   at least three grinding mechanisms provided at an open end of the body through which condiments ground by the respective grinding mechanisms are to be dispensed;
   an actuator for, upon actuation, generating a drive that drives the grinding mechanisms via respective transmission paths;
   a clutch in each of the transmission paths for establishing and disestablishing transmission of the drive via that transmission path; and
   a manually operable selecting mechanism for selecting and operating each of the clutches in order to establish transmission of the drive via the respective transmission path, the selecting mechanism comprising a selector and at least three operators where each operator is used for operating a respective clutch;
   wherein:
   each of the operators comprises a first part and a second part together for providing a cam action to translate a motion in a first direction applied by the selector into a motion in a second direction applied to the respective clutch, whereby the clutch is operated; and
   the body has a main axis, and the first part is movable by the selector transversely to the main axis and the second part is movable by the first part parallel to the main axis.

2. The condiment grinder as claimed in claim 1, wherein each of the clutches comprises a driving part and driven part which upon engagement transmits drive and upon disengagement does not transmit drive.

3. The condiment grinder as claimed in claim 2, wherein the driving part is resiliently biased against the driven part such that the clutch is normally at an operating position for establishing the transmission.

4. The condiment grinder as claimed in claim 3, wherein each clutch includes a spring that resiliently biases the driving part against the respective driven part.

5. The condiment grinder as claimed in claim 1, wherein each of the operators is engageable with a respective clutch against a resilient bias to disestablish transmission of the drive via the respective transmission path.

6. The condiment grinder as claimed in claim 1, wherein the first parts are resiliently biased away from the main axis of the body.

7. The condiment grinder as claimed in claim 6, wherein the first parts are resiliently biased away from the main axis by respective coil springs.

8. The condiment grinder as claimed in claim 1, wherein the selector is configured to permit movement of a selected one of the operators, thereby allowing the clutch to reach the operating position against a resilient bias.

9. The condiment grinder as claimed in claim 8, wherein the selector comprises a ring with a recess on its inner periphery for receiving one of the operators aligned therewith, with the first part of the aligned operator then moving into the recess under the action of a resilient bias thereby causing movement of the second part to in turn operate the respective clutch to, in the operating position, establish the transmission in the respective one path.

10. The condiment grinder as claimed in claim 1, wherein the selector is configured to be turned relative to the body and move the recess to align with one of the operators.

11. The condiment grinder as claimed in claim 1, wherein the selector and the body are in inter-engagement by inter-engageable parts to define a plurality of predetermined angular positions for the selecting mechanism relative to the body.

12. The condiment grinder as claimed in claim 11, wherein the inter-engageable parts comprise a protrusion and a series of recesses corresponding to the predetermined positions.

13. The condiment grinder as claimed in claim 1, wherein the body is divided into three or more compartments for containing different types of condiment seeds.

14. The condiment grinder as claimed in claim 1, wherein the grinding mechanism comprising a female grinder and a male grinder supported co-axially in the female grinder for rotation relative thereto for grinding condiment, the two grinders being spaced apart by an annular gap in which condiment is to be ground.

15. The condiment grinder as claimed in claim 14, wherein the female grinder is separated from the male grinder by a gap, the grinders are movable relative to one another to adjust width of the gap between the grinders and in turn the condiment grinding size.

16. The condiment grinder as claimed in claim 1, wherein the actuator is configured to be turned relative to the body to generate the drive.

17. The condiment grinder as claimed in claim 1, wherein the actuator includes a shaft connected to a drive output gear that is meshed with a driving part of each of the clutches such that turning of the actuator will bring about rotation of the driving parts of all the clutches.

18. The condiment grinder as claimed in claim 1, wherein the open end of the body is attached to a base for standing the body on a surface.

19. A condiment grinder comprising:
a body for containing different types of condiment seeds;
at least three grinding mechanisms provided at an open end of the body through which condiments ground by the respective grinding mechanisms are to be dispensed;
an actuator for, upon actuation, generating a drive that drives the grinding mechanisms via respective transmission paths;
a clutch in each of the transmission paths for establishing and disestablishing transmission of the drive via that transmission path; and
a manually operable selecting mechanism for selecting and operating each of the clutches in order to establish transmission of the drive via the respective transmission path, the selecting mechanism comprising a selector and at least three operators where each operator is used for operating a respective clutch;
wherein the selector is configured to permit movement of a selected one of the operators, thereby allowing the clutch to reach the operating position against a resilient bias.

20. A condiment grinder comprising:
a body for containing different types of condiment seeds;
at least three grinding mechanisms provided at an open end of the body through which condiments ground by the respective grinding mechanisms are to be dispensed;
an actuator for, upon actuation, generating a drive that drives the grinding mechanisms via respective transmission paths;
a clutch in each of the transmission paths for establishing and disestablishing transmission of the drive via that transmission path; and
a manually operable selecting mechanism for selecting and operating each of the clutches in order to establish transmission of the drive via the respective transmission path, the selecting mechanism comprising a selector and at least three operators where each operator is used for operating a respective clutch;
wherein the selector is configured to be turned relative to the body and move the recess to align with one of the operators.

21. A condiment grinder comprising:
a body for containing different types of condiment seeds;
at least three grinding mechanisms provided at an open end of the body through which condiments ground by the respective grinding mechanisms are to be dispensed;
an actuator for, upon actuation, generating a drive that drives the grinding mechanisms via respective transmission paths;
a clutch in each of the transmission paths for establishing and disestablishing transmission of the drive via that transmission path; and
a manually operable selecting mechanism for selecting and operating each of the clutches in order to establish transmission of the drive via the respective transmission path, the selecting mechanism comprising a selector and at least three operators where each operator is used for operating a respective clutch;
wherein the selector and the body are in inter-engagement by inter-engageable parts to define a plurality of predetermined angular positions for the selecting mechanism relative to the body.

* * * * *